United States Patent [19]

Meyer

[11] Patent Number: 5,018,122
[45] Date of Patent: May 21, 1991

[54] LINEAR MOTOR ACTUATOR FOR MOVING AN OPTICAL READ/WRITE HEAD

[75] Inventor: Karl-Hanns Meyer, Aachen, Fed. Rep. of Germany

[73] Assignee: U.S. Philips Corporation, New York, N.Y.

[21] Appl. No.: 321,619

[22] Filed: Mar. 9, 1989

[30] Foreign Application Priority Data

Mar. 15, 1988 [DE] Fed. Rep. of Germany ....... 3808510

[51] Int. Cl.$^5$ .............................................. G11B 7/00
[52] U.S. Cl. .................................. 369/44.14; 360/106
[58] Field of Search .......................... 310/12, 13, 27; 360/105, 106, 107; 369/43, 44.14

[56] References Cited

U.S. PATENT DOCUMENTS 4,396,966 8/1983 Scranton et al. ..................... 360/106

Primary Examiner—Robert L. Richardson
Attorney, Agent, or Firm—David R. Treacy

[57] ABSTRACT

An electrodynamic actuator for optical storage systems comprising an electromechanical actuating device which is constructed to move an optical write and/or read unit into write or read operating positions relative to a storage medium, comprising a linear motor which comprises spaced apart parallel stator sections, which are constituted by rod-shaped stator iron elements carrying induction coils which are stationary relative to the stator, a permanent magnet being arranged between said stator sections and being guided to be longitudinally movable in a direction of translation between the axial ends of the stator sections. The permanent magnet carries the optical system of the optical unit and has a magnetic field which is oriented perpendicularly to the direction of translation and parallel to a central plane in which the stator irons, the induction coils and the permanent magnet itself are arranged. The permanent magnet is movable between the stator sections relative to the common central plane, a plurality of induction coils are arranged after each other in the longitudinal direction on each rod-shaped stator iron element, and can be switched into and out of circuit separately, and conductor bundles extend parallel to the stator sections between the permanent magnet and the two stator sections and are combined at the axial ends of the stator sections to form one or more focussing coils.

13 Claims, 8 Drawing Sheets

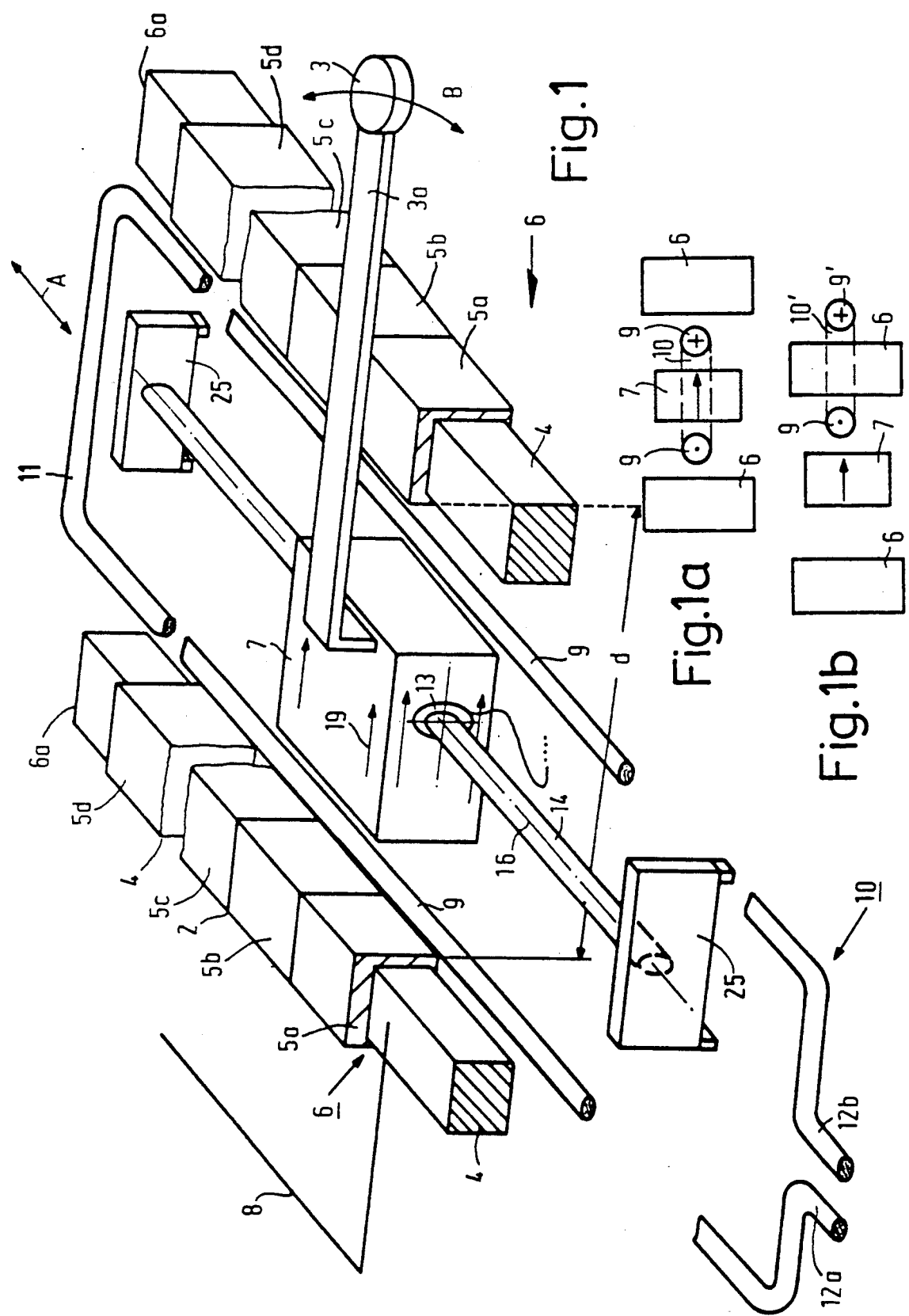

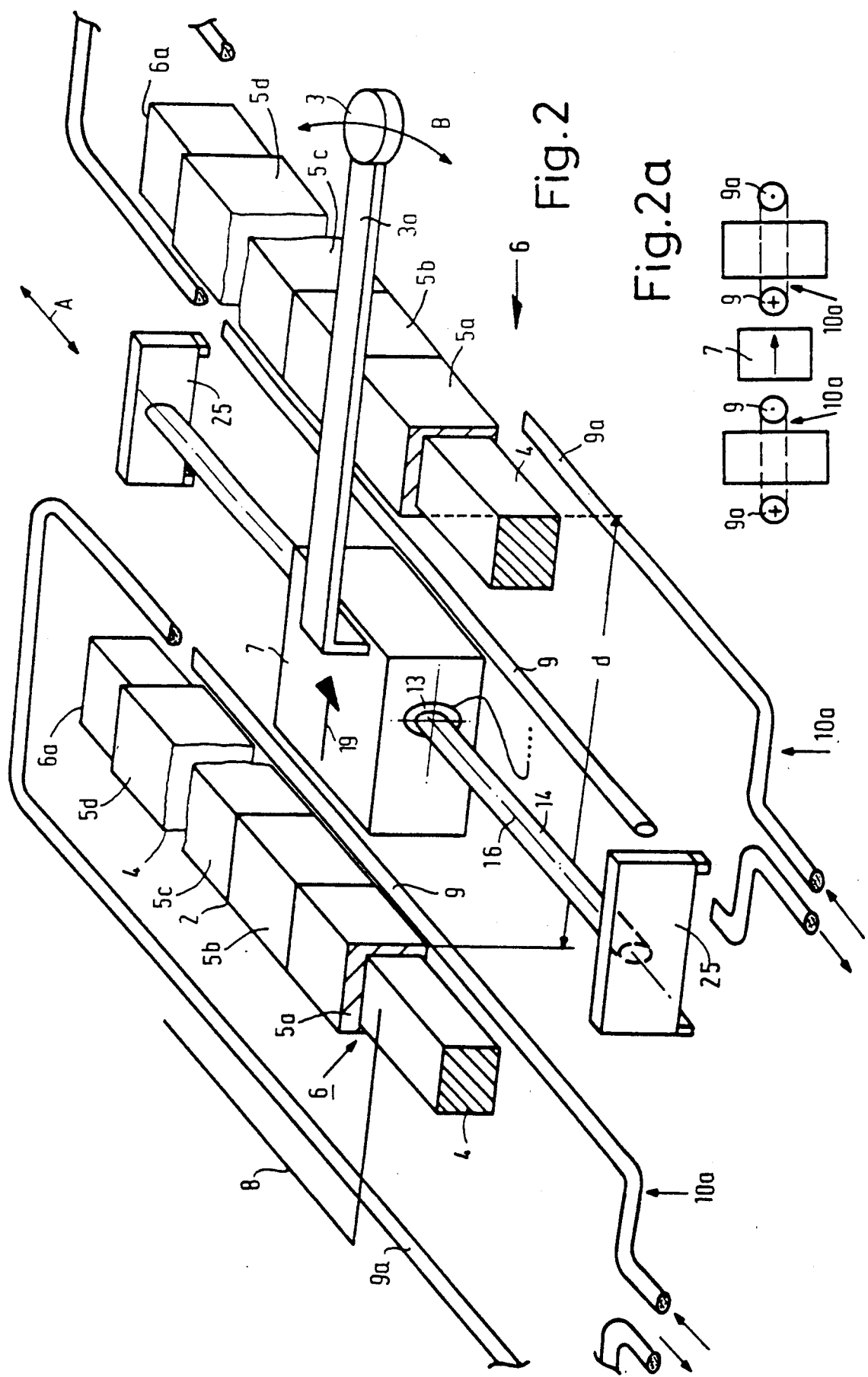

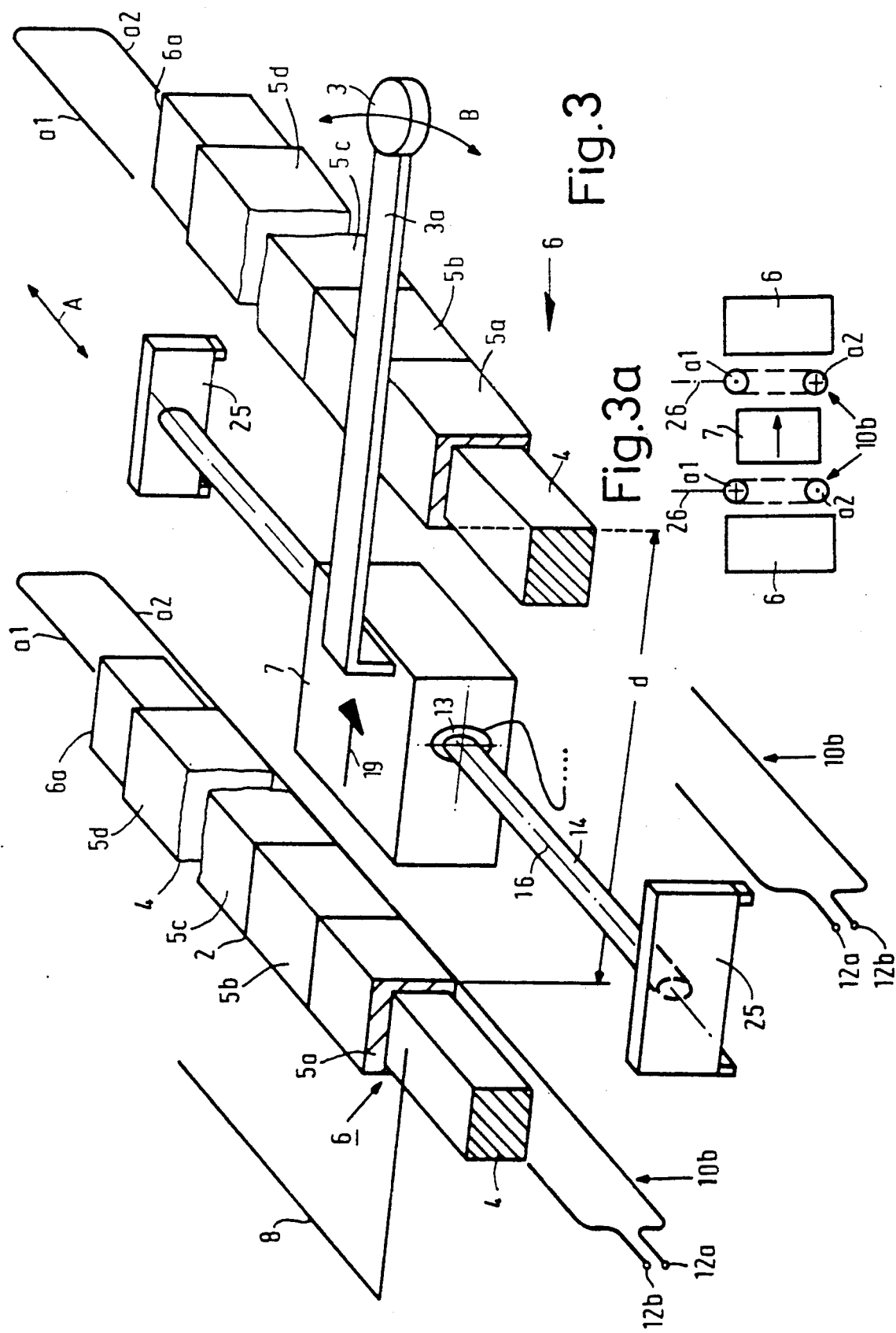

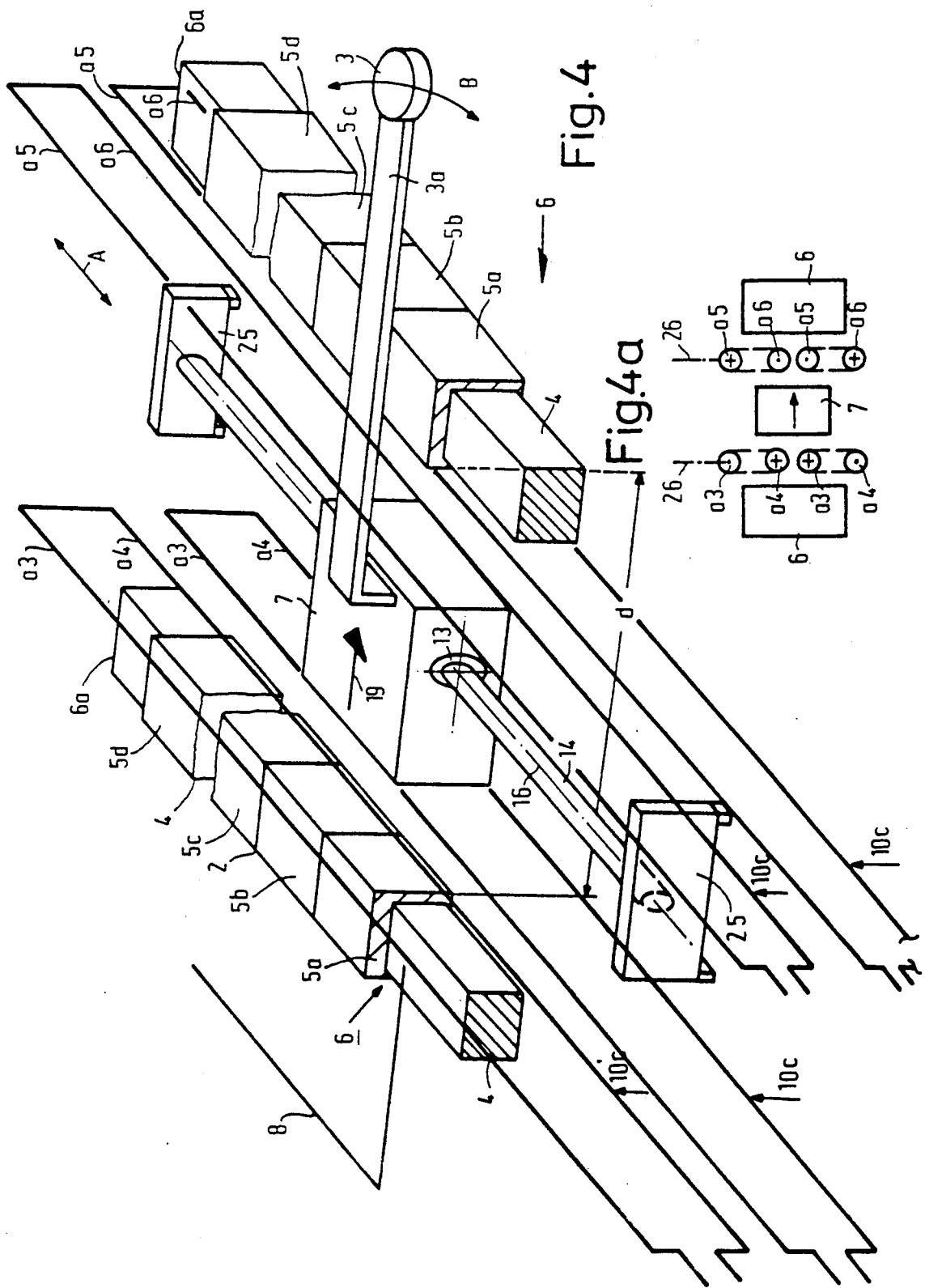

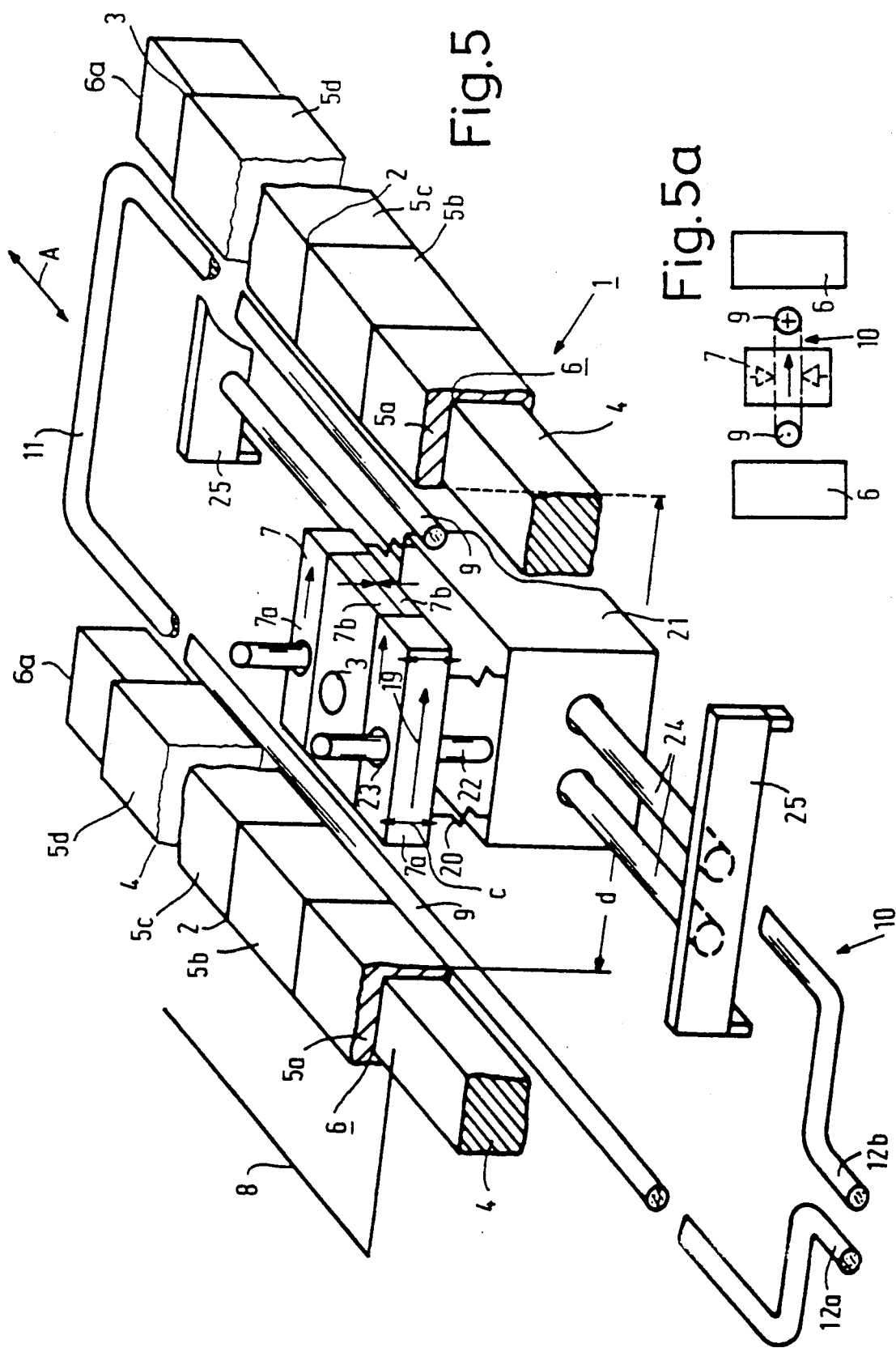

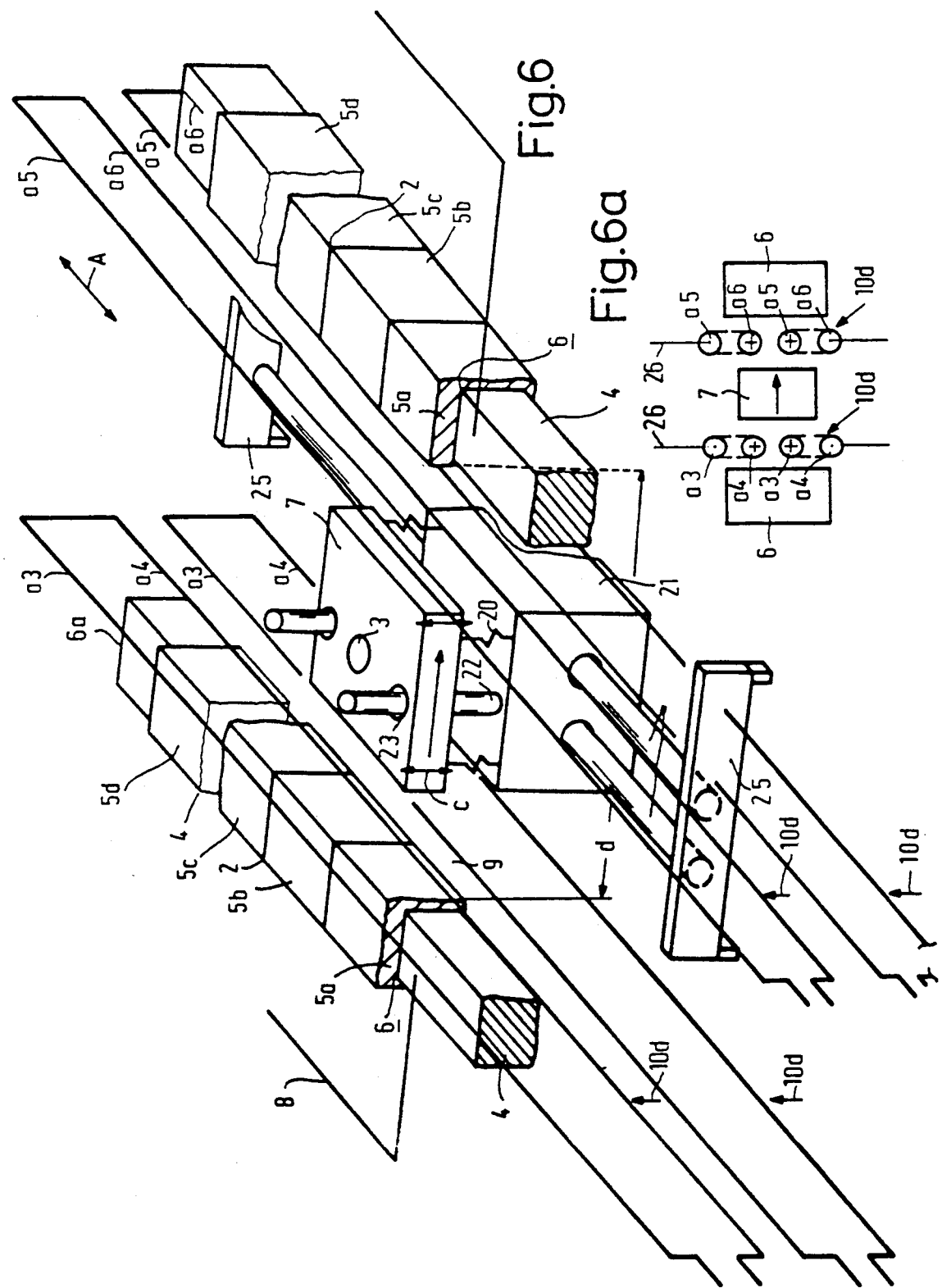

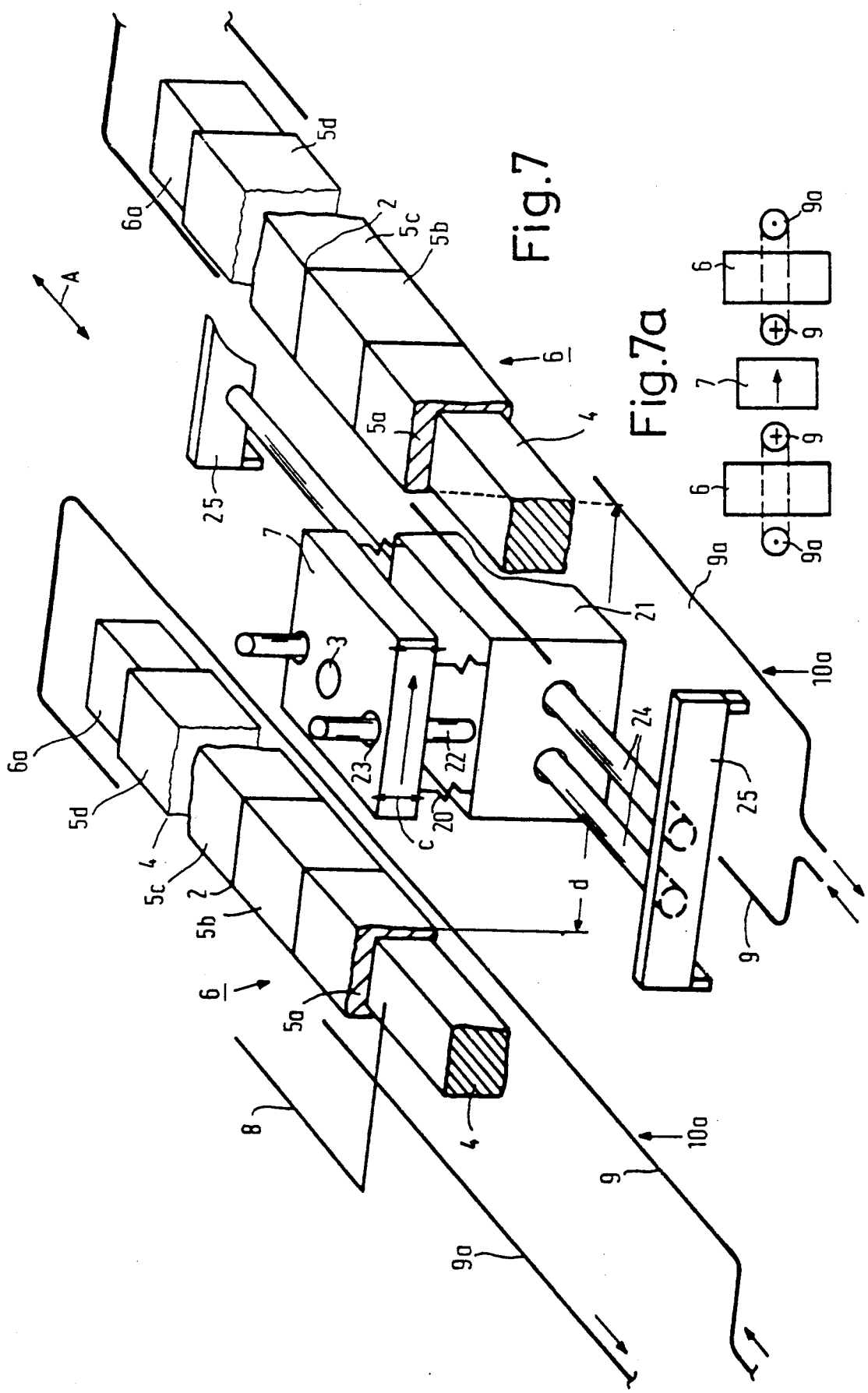

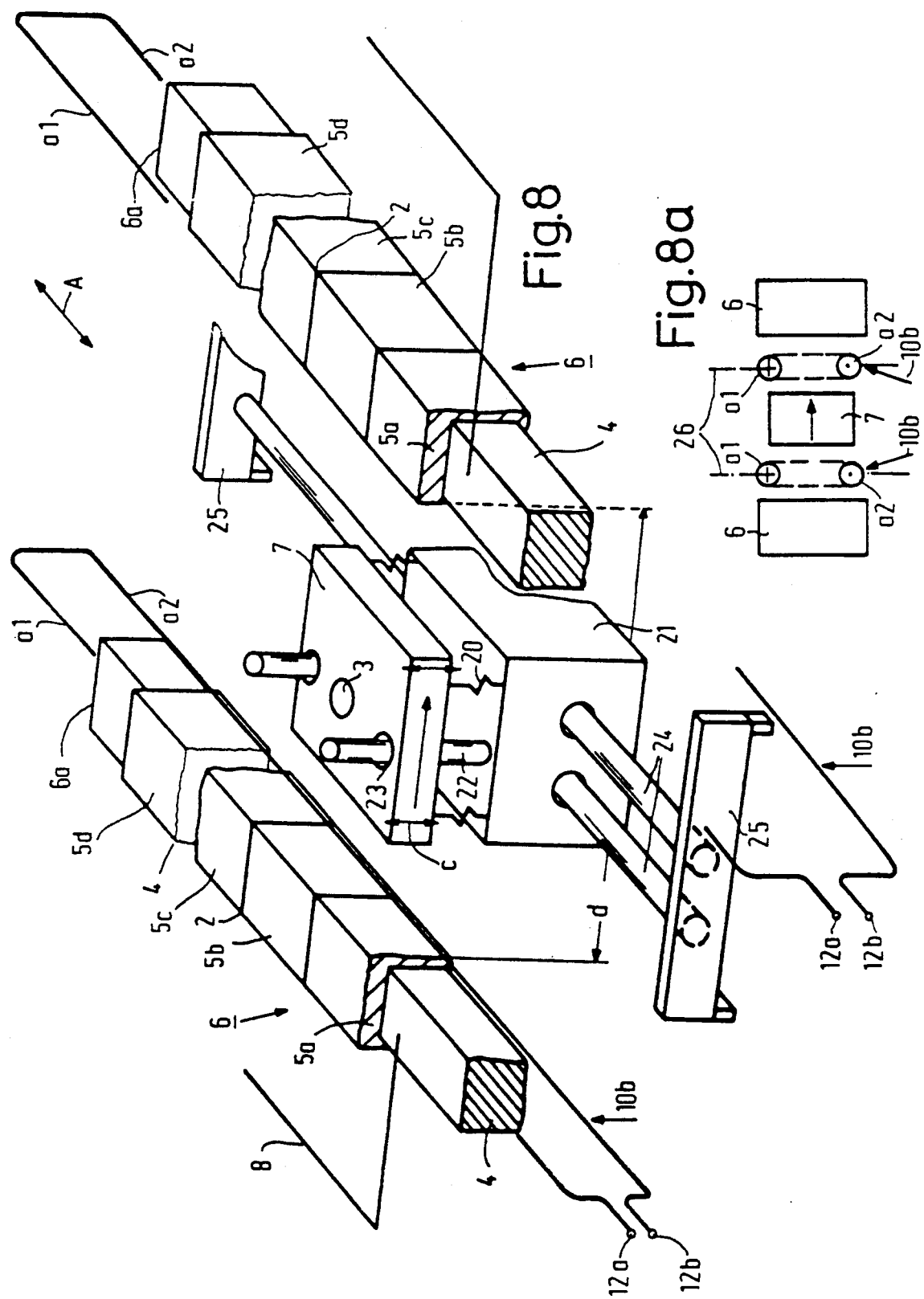

LINEAR MOTOR ACTUATOR FOR MOVING AN OPTICAL READ/WRITE HEAD

BACKGROUND OF THE INVENTION

The invention relates to an electrodynamic actuator for optical storage systems comprising an electromechanical actuating device which is constructed to move an optical write and/or read unit into write and/or read operating positions relative to a storage medium, a radiation beam which is aimed at the operating positions by the optical unit being focussed at these positions by moving the optical system of the optical unit. The actuating device comprises a linear motor which comprises spaced-apart parallel stator sections, which are constituted by rod-shaped stator iron rods or elements carrying induction coils which are stationary relative to the stator. A permanent magnet is arranged between the stator sections and is guided to be longitudinally movable in a direction of translation between the axial ends of the stator sections. The permanent magnet carries the optical system of the optical unit and has a magnetic field which is oriented perpendicularly to the direction of translation and parallel to a central plane in which the stator irons, the induction coils and the permanent magnet itself are arranged.

Electrodynamic actuators of this type are known in audio, video and data technology. By means of an optical system a light beam is focussed onto a storage medium, for example a rotating disc (DE-OS 28 10 616). In this DE-OS the radiation beam is only used for reading; however, it can also be used for writing, as is known from DE-OS 16 13 987. Both during writing and reading the laser beam must first be brought to the write and/or read position by means of an electromechanical actuating device, after which the objective is focussed accurately at the point to be written or read.

A known electromechanical actuating device comprises a pivotal arm by means of which the radiation beam can be moved in a substantially radial direction over the disc surface. This positioning process is combined with an additional radial and tangential correction and with the focussing operation in a direction normal to the disc surface. In addition to single-stage radial positioning systems two-stage radial position systems are known in which a slide is initially coarse-positioned, after which fine-positioning is effected by means of a second stage. However, two positioning stages are intricate.

The prior-art electrodynamic actuator for optical storage systems thus performs movements in three directions, of which two directions are perpendicular to each other.

The known actuators are comparatively intricate. The optical system may be supported in a floating manner in a magnet system which is aligned via a coil system which is coupled to the optical system and which is disposed in the magnet field prior to this, however, the electromechanical actuating device already should have brought the optical unit in the operating position. An actuator which can perform a correction in a radial, axial and tangential direction is known, for example from DE-OS 35 29 091.

U.S. Pat. No. 46 13 962 describes an electrodynamic actuator for optical storage systems, in which an optical write/read unit is movable relative to a disc-shaped storage medium on a slide, which slide constitutes the movable part of a linear motor and for this purpose carries a permanent magnet. The stator of the linear motor comprises parallel rod-shaped stator iron elements carrying induction coils which are stationary relative to the stator. The slide with its permanent magnet is guided so as to be longitudinally movable between the axial ends of the stator sections and carries the optical unit. The permanent magnet is provided with pole-pieces, which direct the magnet flux out of a plane parallel to the central plane of the stator irons towards the central plane of the stator iron elements and the stator iron elements themselves. This magnet arrangement does not allow focussing movements of the optical unit.

From DE-PS 25 42 299 a linear motor is known whose rod-shaped stator iron elements carry a plurality of induction coils which are arranged after each other in the longitudinal direction and which can be switched into and out of circuit separately to shift the stator through a specific range, which results in a corresponding translation of the permanent magnet of the slide.

From EP 0,112,595 it is known to suspend the optical system of an electrodynamic actuator elastically by means of spring arms in order enable the focussing movements of the optical unit to be obtained. In this construction the coils of the linear motor are arranged on the slide and permanent magnets are arranged stationarily on the stator. The slide carries further coils, which surround the guide members of the slide and which provide the linear movement. All the coils of this system require flexible connections.

SUMMARY OF THE INVENTION

It is the object of the invention to provide an electrodynamic actuator in which the radial correction and radial position are performed in a unitary motional system which can also provide the axial correction for the purpose of focussing.

According to the invention this object is achieved in that the permanent magnet is movable between the stator sections relative to the common central plane, a plurality of induction coils are arranged after each other int the longitudinal direction on each rod-shaped stator iron element or rod and can be switched into and out of circuit sparately, and conductor bundles extend parallel to the stator sections between the permanent magnet and the two stator sections and are combined at the axial ends of the stator sections to form one or more focussing coils.

Thus, such an electrodynamic actuator only comprises a linear motor and a focussing actuator associated with the armature of this linear motor, the magnet of the linear motor also constituting the magnet of the focussing actuator. The only complementary parts of the linear motor are then the focussing coil(s), which can be manufactured and mounted without any problems, and the elastic suspension of the permanent magnets in a vertical direction. Such an electrodynamic actuator can be manufactured very economically; its drive does not pose any problems.

In a further embodiment of the invention the permanent magnet is magnetized transversely of the direction of translation and is supported to be movable along a translation axis parallel to the direction of translation and to be pivotable about said axis, the optical unit being carried by the permanent magnet via a supporting arm. For the purpose of focussing a conductor bundle of a single focussing coil extends along each stator section between this section and the permanent magnet, which may be bodily magnetized.

This actuator construction is simple, is very sensitive and operates very rapidly. The focussing coil produces a torque to raise or lower the optical unit by small amounts.

In a modification of this embodiment of the invention comprising only one focussing coil, one conductor bundle of the focussing coils disposed in the central plane extends along each stator section between said stator section and the permanent magnet and is returned outside said stator section via a conductor bundle. If the currents in the two focussing coils have the same direction the resulting forces will produce a torque in the same way as in the first embodiment.

In a further embodiment of the actuator comprising an optical system arranged on a pivotal arm, focussing coils extend parallel to the direction of translation between the stator sections and the permanent magnet and each comprise two spaced-apart conductor bundles which are disposed above and below the central plane in coil planes perpendicular to said central plane. If the focussing coils are energized oppositely this again results in a torque which acts on the arm supporting the optical unit.

In a further embodiment of the invention the focussing coils are juxtaposed in pairs at opposite sides of the permanent magnet, so that conductor bundles extend adjacent the permanent magnet in the coil planes. If the coils at opposite sides are energized oppositely this again results in a torque which acts on the supporting arm and the optical unit.

In a further embodiment of the invention the permanent magnet comprises a plurality of separate magnet parts of which, viewed in the direction of translation, two spaced-apart outer magnet parts are magnetized in the same direction transverse to the direction of translation, and inner magnet parts, which are magnetized towards one another, are interposed between said outer magnet parts and are superposed one on the other in a direction perpendicular to the central plane. The permanent magnet is arranged to be movable parallel to the central plane and to be raised and lowered in a direction substantially perpendicular to the central plane, one conductor bundle of a single focussing coil extending between the permanent magnet and each stator section. This embodiment of the invention provides a lifting force and partly also a torque acting on the magnet.

In a further embodiment of the invention the permanent magnet is bodily magnetized in a direction perpendicular to the longitudinal direction of the actuator, the permanent magnet is arranged to be movable parallel to the central plane in the longitudinal direction of the actuator and to be raised and lowered perpendicularly to the central plane, and between each stator section and the permanent magnet a focussing coil is arranged at opposite sides of the central plane, the two coils at both sides of the permanent magnet being arranged in common coil planes perpendicular to the central plane. Energizing the coils at opposite sides of the magnet with the same polarity then results in a lifting force which acts on the magnet.

In a further embodiment of the invention the permanent magnet is bodily magnetized in a direction parallel to the central plane, the permanent magnet is arranged to be movable parallel to the central plane and to be raised and lowered perpendicularly to the central plane, and one conductor bundle of focussing coils which are disposed in the central plane extends along every stator section between said section and the permanent magnet and is returned outside said stator section. When the coils are energized oppositely this result in a lifting force acting on the magnet.

In a further embodiment of the invention the permanent magnet is bodily magnetized in a direction parallel to the central plane and transverse to the longitudinal direction of the actuator, the permanent magnet is arranged to be movable parallel to the central plane and to the stator sections and to be raised and lowered perpendicularly to the central plane, and focussing coils extend parallel to the direction of translation between the stator sections and the permanent magnet and each comprise two spaced apart conductor bundles which are disposed above and below the central plane in coil planes perpendicular to said central plane. This also results in a lifting force acting on the magnet in the case of energization with the same polarity.

In a further embodiment of the invention the permanent magnet is supported non-rigidly, for example elastically, on a slide which is movable parallel to the stator sections. A variety of constructions may be adopted for such a slide. For example, it can be moved on guide members, like a runner, or by means of rollers, like a carriage.

In a further embodiment of the invention the parallel ends of the stator sections terminate freely without a magnetic coupling to one another. When the stator ends remain open an effective control of the axial movement can be achieved.

An embodiment of the invention will now be described in more details, by way of example, with reference to the drawings.

BRIEF DESCRIPTION OF THE DRAWINGS

FIG. 1 shows diagrammatically an electrodynamic actuator for optical storage systems, comprising a linear motor on which an actuator magnet with an optical unit is supported to be axially movable and pivotable, FIG. 1a is a diagram illustrating the principle of the actuator shown in FIG. 1, FIG. 1b is a modification of the drive principle in accordance with FIG. 1a, FIG. 2 shows the actuator of FIG. 1 with a different focussing coil arrangement, FIG. 2a is a diagram illustrating principle of the arrangement shown in FIG. 2, FIGS. 3, 3a and 4, 4a show further embodiments of the actuator, comprising pivotable magnets and different focussing coil arrangements, FIGS. 5, 5a; 6, 6a; 7, 7a; 8, 8a show further embodiments of the electrodynamic actuator comprising different focussing coil-arrangements.

DESCRIPTION OF THE PREFERRED EMBODIMENTS

An electrodynamic actuator, which is shown diagrammatically in FIG. 1 and which is particularly suitable for use in optical storage systems, is capable of performing two mutually independent movements. In one direction of movement indicated by an arrow A, an optical unit 3 should be movable over a travel of approximately 200 mm to 300 mm. The length of this travel depends on the disc diameter in the case that rotating storage discs are scanned. A slightly arcuate movement, indicated by an arrow B, should provide a displacement of the optical unit 3 over a few millimeters only.

In principle, the electrodynamic actuator may comprise a linear motor as described in DE-PS 25 42 299. For further details not given in the present application reference is made to said DE-PS.

The linear motor on which the actuator is based comprises two stator iron rods 4, on which induction coils 5a, 5b, 5c, 5d . . . are arranged. The individual stator coils 5a to 5d of the two stator rods 4 can be energized independently of each other. The two stator rods 4 and the induction coils 5 arranged on them constitute units, hereinafter referred to as stator sections 6, between which a magnet field can be built up.

The stator sections 6 are spaced from each other and their axial ends 6a are open, i.e. they are not interconnected via magnetically conductive links. The stator sections 6 are disposed at a distance d from one another, thus enabling a permanent magnet 7 to be arranged between these sections. Conductor bundles 9 of a focussing coil 10 are disposed in a central plane 8 through the two stator sections 6. The conductor bundles 9 are interconnected via a bridge 11 near those ends 6a of the stator sections 6 which are situated at the rear in the drawing. Their terminal leads 12a and 12b are connected to a control device, not shown. For simplicity the focussing coil 10 is represented as a thick wire. In practice, this focussing coil 10 comprises a plurality of thin-wire layers. In general the height of the coils will correspond to the height of the stator ion.

The permanent magnet 7 in FIG. 1 is formed with a bore 13 which extends in the longitudinal direction of the actuator. A spindle 14, which is supported in end plates 15, extends through the bore 13. The axis of the spindle 14 bears the reference numeral 16. A supporting arm 3a, carrying the optical unit 3 which is pivotable as indicated by the double arrow D, cooperates with the permanent magnet, which is magnetized in the direction 19 transverse to the axis 16. The permanent magnet 7 is supported on the rod 14 so as to be pivotable with minimal friction.

The travel of the permanent magnet 7 in the direction indicated by the double arrow A may be approximately 200 mm to 300 mm, depending on the dimensioning of the actuator. The superimposed pivotal movement of the permanent magnet 7 in the direction indicated by the double arrow B is only a few millimeters. The translation in the direction indicated by the double arrow A corresponds to a radial movement relative to a rotating disc which is scanned in order to be inscribed or read. The translation in the direction indicated by the double arrow B, which is superposed on the movement in the direction indicated by the double arrow A and which is performed by the permanent magnet 7 alone, corresponds to a focussing movement towards the rotating disc.

The translation of the permanent magnet 7 in the direction indicated by the double arrow A is obtained in that the individual induction coils 5, arranged opposite the permanent magnet 7, are excited sequentially in the desired direction of movement, so that a magnetizing field is obtained which travels in the desired direction of movement and thereby drives the permanent magnet 7. If a focussing movement in the direction indicated by the double arrow B is required the focussing coil 10 is energized in the desired focussing direction. The energization follows from FIG. 1a. The magnetic field of the focussing coil 10 then, acts on the permanent magnet. This causes the permanent magnet to be rotated in conformity with the energization of the focussing coil 10. If the induction coil 5 is also energized, so that the fields of the coils 5 and 10 are superimposed, a combined axial and focussing movement will be performed.

FIG. 1b shows a modified construction of the actuator, in which the focussing coil 10' comprises conductor bundles 9 and 9' arranged around one of the stator sections 6. In addition to a torque this modified construction also produces a lifting force.

FIG. 2 shows diagrammatically a modification of the embodiment shown in FIG. 1. In this case only the focussing-coil arrangement has been modified in such a way that a conductor bundle 9 of each of the focussing coils 10a, which are disposed in the central plane 8 extend along the respective stator section 6 between this section and the permanent magnet 7 and is returned outside the stator sections 6 via conductor bundles 9a.

When the focussing coils are energized with the same polarity, as is indicated in FIG. 2a, a torque about the axis 16 will act on the permanent magnet 7.

FIG. 3 shows diagrammatically a modification of the embodiment shown in FIG. 1 or 2. Again only the focussing coil arrangement has been modified, in such a way that focussing coils 10b extend parallel to the direction of translation A between the stator sections 6 and the permanent magnet 7, which coils each comprise two spaced apart conductor bundles $a_1$, $a_2$ which are disposed above and below the central plane 8 in coil planes 26 perpendicular to this central plane.

When the focussing coils, as is illustrated in FIG. 3a, are energized oppositely a torque about the axis 16 will be obtained.

FIG. 4 shows diagrammatically a modification of the embodiment shown in FIGS. 1 to 3. In comparison with FIG. 3 the focussing-coil arrangement is modified in such a way that the focussing coils 10c are juxtaposed in pairs at opposite sides of the permanent magnet 7 as vertical coil elements 26, so that conductor bundles $a_3$, $a_4$ at one side and conductor bundles $a_5$, $a_6$ are arranged at the other side of the permanent magnet in the coil planes 26. If the focussing coils 10c in the upper parts of the coil planes are energized oppositely and those in the lower parts are also energized oppositely but inverted in comparison with the upper parts (FIG. 4), this again results in a torque which tends to pivot the permanent magnet 7 about the axis 16.

FIGS. 5 to 8 show embodiments in which the permanent magnet is virtually only lifted and lowered by means of a lifting force produced by the field between the stator sections 6. In these embodiments the permanent magnet 7 is elastically supported on a slide 21 by means of springs 20. The elastic spring elements, which are represented as spiral springs, may also be rubber springs or the like. It is merely important that the permanent magnet 7 can move with minimal friction relative to the slide 21 about the pins 22 of the slide 21. The pins 22 are secured to the slide 21 and pass through openings 23 in the permanent magnet 7. The magnet should only be movable up and down along the pins 22. Therefore, the pins should allow the magnet to move with only one degree of freedom, i.e. all other movements should be excluded.

The slide 21 is guided on guide member 24 like a runner, which members are immobilized relative to the axial ends of the linear motor by means of end plates 25. The members 24 extend through the slide 21; the slide 21 is supported on the guide members 24 with low friction. Obviously the members 24 and the slide 21 can also cooperate in a different way, for example the slide can also be moved on the guide members like a carriage by means of wheels.

In FIG. 5 the optical unit 3 is centered relative to the permanent magnet 7. This arrangement in the center of gravity results in a satisfactory balance of the permanent magnet 7 which is movable on the pins 22. The permanent magnet 7 itself comprises a plurality of separate magnets which are assembled, for example cemented, to form a compact unit. Two spaced-apart strip-shaped outer magnet parts 7a extend in the direction of translation (the double arrow A) and have the same direction of magnetization transverse to the direction of translation. Inner magnet parts 7b are interposed between these outer magnet parts 7a and are superposed on each other in a direction perpendicular to the central plane 8, said inner magnet parts being magnetized towards one another. This permanent magnet 7 comprising the magnet parts 7a and 7b can be moved up and down and is resiliently supported relative to the slide 21 in the direction indicated by a double arrow C parallel to the central plane 8. Thus, the embodiment shown in FIG. 5 provides two independent translations in two mutually perpendicular directions, namely the directions A and C.

FIG. 5a illustrates the operating principle of the arrangement shown in FIG. 5 and shows that a conductor bundle 9 of a single focussing coil extends at opposite sides of the permanent magnet 7 between this magnet and the stator sections 6. By means of this arrangement a lifting force can be exerted on the permanent magnet 7, but also a specific torque about the axis 16a. Its guidance by means of the pins 22 prevents the permanent magnet 7 from being rotated by the torque, so that only a linear upward or downward movement caused by the lifting force is produced.

FIG. 6 shows an embodiment comprising an optical unit 3 arranged in the center of the permanent magnet 7. The permanent magnet 7 is magnetized over its whole bulk in a direction transverse to the longitudinal direction of the actuator. The single focus coil 10 shown in FIG. 5 has been replaced by two focussing coils 10d, which extend perpendicularly to the central plane 8 between the permanent magnet 7 and the stator sections 6. Thus, the conductor bundles $a_3$, $a_4$ and $a_5$, $a_6$ extend at opposite sides of the central plane 8 in coil planes 26 perpendicular to the central plane 8. The focussing coils 10d are connected to a control device, not shown, via their terminal leads. In this construction the permanent magnet 7 is also moved up and down relative to the slide 14 in the direction indicated by the double arrow C perpendicular to the direction A depending on its drive when the focussing coils 10d are energized with currents having directions as indicated in FIG. 6a. In the situation shown in FIG. 6a the focussing coils 10b in the two coil planes 26 are energized similarly with opposite currents.

FIG. 7 shows an embodiment in which the focussing coils 10a are disposed in the central plane 8. One conductor bundle 9 extends between the permanent magnet 7 and each stator section, the other conductor bundle 9a is returned outside the magnet arrangement. When the focussing coils 10a, as indicated in FIG. 7a, are energized with currents of the same polarity and the permanent magnet 7 is magnetized transversely a lifting force will act on the permanent magnet 7.

FIG. 8 shows a further embodiment comprising a permanent magnet 7 which is magnetized parallel to the central plane 8 and transversely of the longitudinal direction of the actuator. In the same way as in the embodiments shown in FIGS. 5 to 7 the permanent magnet 7 can be translated on a slide 21 parallel to the central plane 8 and to the stator sections 6 and can be raised and lowered in a direction perpendicular to the central plane 8. Focussing coils 10b are arranged between the stator sections 6 and the permanent magnet 7 and each comprise two spaced-apart conductor bundles $a_1$, $a_2$, which are disposed above and below the central plane 8 in coil planes 26 perpendicular to said central plane. When the two focussing coils are energized with the same polarity, as can be seen in FIG. 8a, a lifting force in the direction indicated by the arrow C will act on the permanent magnet 7.

I claim:

1. An electrodynamic actuator for optical storage systems comprising an electromechanical actuating device which is constructed to move an optical write and/or read unit into write and/or read operating positions relative to a storage medium, a radiation beam which is aimed at the operating positions by the optical unit being focussed at said positions by moving the optical system of the optical unit, the actuating device comprising a linear motor which comprises spaced apart parallel stator sections, which are constituted by rod-shaped stator iron elements carrying induction coils which are stationary relative to the stator, a permanent magnet being arranged between said stator sections and being guided to be longitudinally movable in a direction of translation between the axial ends of the stator sections, which permanent magnet carries the optical system of the optical unit and has a magnetic field which is oriented perpendicularly to the direction of translation and parallel to a central plane in which the stator iron elements, the induction coils and the permanent magnet itself are arranged, characterized in that the permanent magnet is movable between the stator sections relative to the common central plane, a plurality of induction coils are arranged after each other in the longitudinal direction on each rod-shaped stator element, and can be switched into and out of circuit separately, and conductor bundles extend parallel to the stator sections between the permanent magnet and the two stator sections and are combined at the axial ends of the stator sections to form one or more focussing coils.

2. An electrodynamic actuator as claimed in claim 1, characterized in that the permanent magnet is magnetized transversely of the direction of translation and is supported to be movable along a translation axis parallel to the direction of translation and to be pivotable about said axis, the optical unit being carried by the permanent magnet via a supporting arm.

3. An electrodynamic actuator as claimed in claim 1 or 2, characterized in that one conductor bundle of a single focussing coil extends along each stator section between this section and the permanent magnet.

4. An electrodynamic actuator is claimed in claim 1 or 2, characterized in that one conductor bundle of the focussing coils disposed in the central plane extends along each stator section between said section and the permanent magnet is returned outside said stator section via a conductor bundle.

5. An electrodynamic actuator as claimed in claim 1 or 2, characterized in that focussing coils extend parallel to the direction of translation between the stator sections and the permanent magnet, and each comprise two spaced-apart conductor bundles, which are disposed above and below the central plane in coil planes perpendicular to said central plane.

6. An electrodynamic actuator as claimed in the claim 1 or 2, characterized in that the focussing coils are juxtaposed in pairs in perpendicular coil planes at opposite sides of the permanent magnet, so that conductor bundles extend at one side and at the other side of the permanent magnet in the coil planes.

7. An electrodynamic actuator as claimed in claim 1, characterized in that the permanent magnet comprises a plurality of separate magnet parts of which, viewed in the direction of translation, two spaced-apart outer magnet parts are magnetized in the same direction transverse to the direction of translation, and in that inner magnet parts, which are magnetized towards another, are interposed between said outer magnet parts and are supposed one on the other in a direction perpendicular to the central plane, the permanent magnet being arranged to be movable parallel to the central plane and to be raised and lowered in a direction substantially perpendicular to the central plane, one conductor bundle of a single focussing coil extending between the permanent magnet and each stator section.

8. An electrodynamic actuator as claimed in claim 1, characterized in that the permanent magnet is bodily magnetized in a direction perpendicular to the longitudinal direction of the actuator, in that the permanent magnet is arranged to be movable parallel to the central plane in the longitudinal direction of the actuator and to be raised and lowered perpendicularly to the central plane, and in that between each stator section and the permanent magnet a focussing coil is arranged at opposite sides of the central plane, the two coils at both sides of the permanent magnet being arranged in common coil planes perpendicular to the central plane.

9. An electrodynamic actuator as claimed in claim 1, characterized in that the permanent magnet is bodily magnetized in a direction parallel to the central plane, in that the permanent magnet is arranged to be movable parallel to the central plane and to be raised and lowered perpendicularly to the central plane, and in that one conductor bundle of focussing coils which are disposed in the central plane extends along every stator section between said section and the permanent magnet and is returned outside said stator section.

10. An electrodynamic actuator as claimed in claim 1, characterized in that the permanent magnet is bodily magnetized in a direction parallel to the central plane and transverse to the longitudinal direction of the actuator, in that the permanent magnet is arranged to be movable parallel to the central plane and to the stator sections and to be raised and lowered perpendicularly to the central plane, and in that focussing coils extend parallel to the direction of translation between the stator sections and the permanent magnet and each comprise two spaced-apart conductor bundles which are disposed above and below the central plane in coil planes perpendicular to said central plane.

11. An electrodynamic actuator as claimed in any one of the claims 1 and 7 to 10, characterized in that the permanent magnet is supported non-rigidly, for example elastically, on a slide which is movable parallel to the stator sections.

12. An electrodynamic actuator as claimed in claim 11, characterized in that the slide is movable on guide members which extend parallel to the stator sections.

13. An electrodynamic actuator as claimed in claim 1 or 2, characterized in that the parallel ends of the stator sections terminate freely without a magnetic coupling to one another.

* * * * *